Feb. 25, 1964   O. F. ARTHUR   3,122,108
PALLETS FOR HANDLING MATERIAL
Filed Sept. 27, 1961   2 Sheets-Sheet 1

INVENTOR.
OSCAR F. ARTHUR
BY
*Murray & Young*
his ATTORNEYS

Feb. 25, 1964 — O. F. ARTHUR — 3,122,108
PALLETS FOR HANDLING MATERIAL
Filed Sept. 27, 1961 — 2 Sheets-Sheet 2
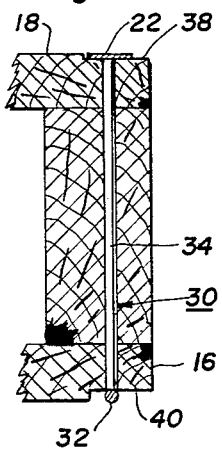
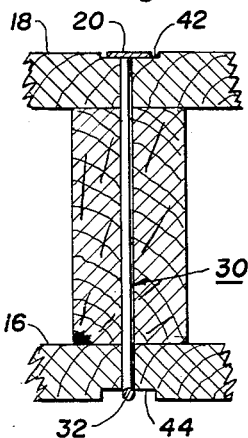
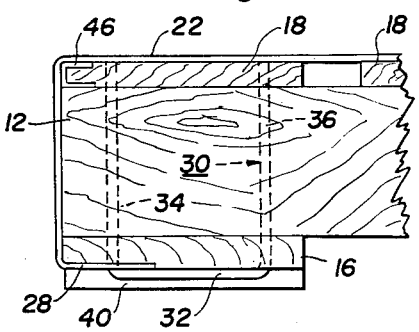
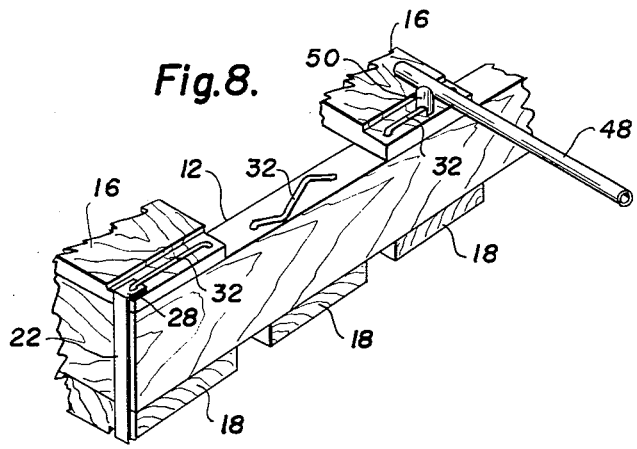
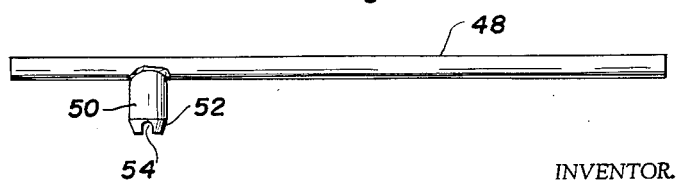
INVENTOR.
OSCAR F. ARTHUR
BY
Murray + Young
his ATTORNEYS United States Patent Office 3,122,108
Patented Feb. 25, 1964

3,122,108
PALLETS FOR HANDLING MATERIAL
Oscar F. Arthur, Silver Spring, Md., assignor to
Oscar F. Arthur, Toledo, Ohio
Filed Sept. 27, 1961, Ser. No. 141,076
7 Claims. (Cl. 108—51)

The present invention relates to pallets, and more particularly to pallets of the type by means of which articles are supported for transport or storage, the pallets being usually handled through the use of fork-lift trucks. This application is a continuation-in-part of copending application Serial No. 4,462, filed January 25, 1960, now U.S. Patent 3,005,610, which latter application is a continuation-in-part of application Serial No. 816,495, filed May 28, 1959, now U.S. Patent 3,016,222.

One object of the present invention is to provide a pallet of such form and made in such manner that it will have greater strength and longer life than those forms of pallets wherein wood deck boards are nailed or bolted to stringers.

Another object of the invention is to provide a pallet that may suitably comprise deck boards, stringers and bottom boards of wood, with an improved manner of binding the parts more firmly together than is the case with wood pallets of the type heretofore commonly employed.

Another object of the invention is to provide a binding element for wooden pallets, panels, building framework, boxes, crates, skids and the like, which binding element may be conveniently tightened to take up shrinkage in the wood of the article occurring as a result of drying of the lumber used in the construction of the article.

A further object of the invention is to provide a method for taking up shrinkage in the boards or other elements of a wooden article occurring as a result of drying of the lumber used in the article.

Still another object of the invention is to provide a pallet which is resistant to damage by impacts from lift forks.

The above and other objects and features of the invention will become apparent from the following detailed description taken in connection with the accompanying drawings which form a part of this specification, and in which:

FIG. 5 is a cross-sectional view taken along line V—V of FIG. 3 showing the location of the U-shaped binder elements and the steel strap to which they are welded with respect to the slats and stringers of the pallet;

FIG. 6 is a sectional view taken along line VI—VI of FIG. 1 showing the relationship of the U-shaped binder elements and the steel strap to which they are welded with respect to the center stringer of the pallet of FIG 1;

FIG. 7 is a broken-away end view, similar to that of FIG. 3, showing an embodiment of the invention wherein the edges of the pallet may be protected against damage by lift forks;

FIG. 8 is a perspective view illustrating the manner in which the binder elements shown in the other figures may be tightened to take up shrinkage occasioned by drying of the lumber used in the pallet; and FIG. 9 is a plan view of the tool illustrated in FIG. 8 for taking up shrinkage in the pallet.

Figure 1:
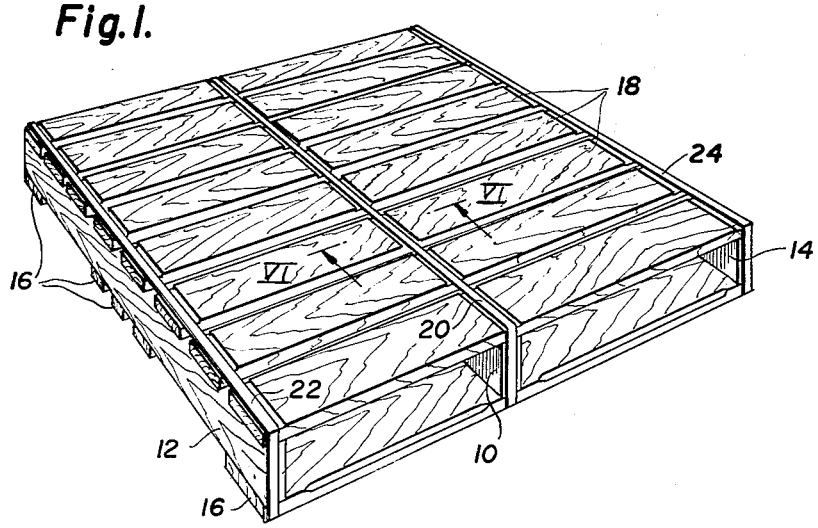
FIGURE 1 is a perspective view of a pallet constructed according to the present invention and employing metallic strip and wire binding members.

Referring now to the drawings, and particularly to FIG. 1, the pallet shown comprises a center stringer 10 and two end stringers 12 and 14 preferably formed from lumber such as 2 x 4 or 2 x 6. Bottom boards or slats 16 are secured to the lower edges of the stringers 10, 12 and 14 in a manner to be hereinafter described; whereas deck boards or slats 18 are likewise secured to the tops of the stringers.

Figure 2:
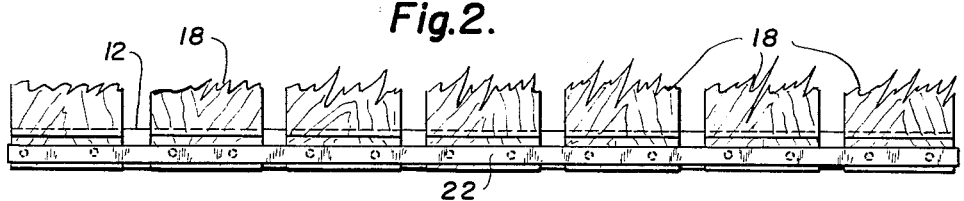
FIG. 2 is a broken-away top view of the deck slats of the pallet of FIG. 1, showing the metal strap of the binding arrangement of the invention which is welded to binding elements extending through the stringers and slats of the pallet.
Figure 3:
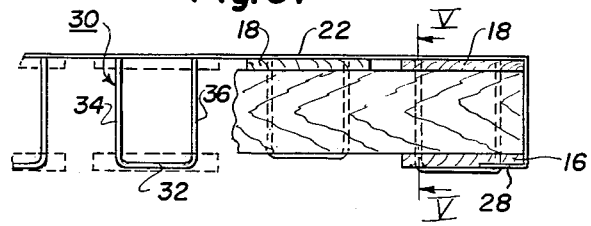
FIG. 3 is partially broken-away end view of the pallet of FIG. 1 showing the generally U-shaped binder elements or staples which are welded to the strap of FIG. 2.
Figure 4:
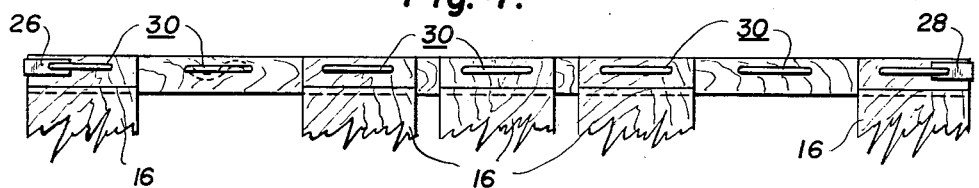
FIG. 4 is a broken-away bottom view of the pallet of FIG. 1.

In accordance with the present invention, the means for securing the stringers 10, 12 and 14 to the bottom and deck slats 16 and 18 includes steel or the like straps 20, 22 and 24, each of which overlies an associated one of the stringers 10, 12 and 14. With particular reference to FIGS. 2, 3 and 4, it will be noted that the strap 22, for example, is bent around the end of stringer 12 and terminates in a pair of short tabs or sections 26 and 28 which extend parallel to the stringers. In the assembly of the pallet, parallel holes are initially drilled in the stringers 10, 12 and 14, and aligned holes are drilled in the bottom and deck slats 16 and 18. Received within these holes are U-shaped steel binder elements or staples 30, each of which comprises a transverse portion 32 which is recessed into the bottom of the pallet, and a pair of integral parallel leg portions 34 and 36 which extend through the holes drilled in the slats and stringers and are welded or otherwise secured at their upper extremities to the strap 22. It will be noted in FIGS. 3 and 4 that one of the legs 34 or 36 in staples at the ends of the pallet passes through a hole in the tab 26 or 28 and is welded thereto so as to provide an anchor for the opposite ends of strap 22. In assembling the pallet, the holes for the reception of staples 30 are initially drilled, the staples inserted into the holes with the slats applied, and the steel straps 20, 22 and 24 spot welded to the upper ends of legs 34 and 36 in a jig or fixture. At the same time, the tabs 26 and 28 are welded to their associated end staples. In this process, the entire pallet is securely bonded together, and the boards or slats 16 and 18 cannot become loosened from the stringers 10, 12 and 14 as would be the case, for example, in a nailed pallet. The fact that the straps 20, 22 and 24 have substantial width enables the holes for the staple legs 34 and 36 to be drilled without a high degree of accuracy as would be the case, for example, where the straps are replaced by wire binders having a diameter substantially equal to the diameters of legs 34 and 36.

With reference now to FIG. 5, it will be noted that the ends of the deck slats 18 are dadoed as at 38 to provide a recessed portion of the reception of strap 22 or 24. Similarly, the bottom slats 16 are dadoed as at 40 to provide a recessed area for the transverse portions 32 of staples 30. On the other hand, it will be noted that grooves 42 and 44 (FIG. 6) are provided for the center strap 20 and the transverse portions 32 of the staples welded to strap 20. The particular manner in which the ends of slats 16 and 18 are dadoed is important for two reasons: First, the recessed portions 38 and 40 need not be dadoed with a high degree of precision as would be the case, for example, where grooves are provided in the deck and bottom slats. That is, if grooves were provided at the ends of the deck and bottom slats rather than the open-ended recessed portions 38 and 40 as shown, the spacing between the grooves 42 and 44 for the center strap 20 and its associated staples would be critical with respect to grooves at the ends of the slats for straps 22 and 24 and their staples. By virtue of the fact that the recessed portions 38 and 40 have substantial width, the precision which would be required with grooves is entirely eliminated. As a second advantage, the recessed portion 38, for example, provides a means whereby the strap 22 or 24 may be moved out close to the edge of the pallet. In this manner, the steel strapping is used to protect the vital edges of the pallet that are exposed to loading damage, and also to protect the stringer edges at their outside corners.

Referring now to FIG. 7, an end view of another embodiment of the invention is shown wherein a U-shaped steel member 46 is placed over the edge of the end deck slat 18 to protect the edge from damage by fork-lift trucks and other causes. The straps 20, 22 and 24 pass over the member 46 and are securely held in place. If desired, however, the member 46 could be extended backwardly and the leg 34 of staple 30 at the end of the pallet passed through holes in the member 46 to securely anchor it.

In any wooden pallet, the lumber from which it is formed will usually dry after the pallet is assembled, meaning that the stringers and slats will shrink. This is particularly troublesome in a nailed pallet where shrinkage will cause the nails to become loosened. In the case of the present invention, as the lumber shrinks, the slats 16 and 18 may become loosened with respect to the stringers 10, 12 and 14. The unique arrangement of binder elements 30 of the present invention, however, provides a convenient means for taking up such shrinkage. With reference to FIGS. 8 and 9, there is shown a tool comprising a bar 48 having a short cylindrical section 50 welded thereto. The lower end of section 50 is tapered as at 52 and is provided with a groove 54 adapted to receive the transverse portions 32 of staples 30. As is shown in FIG. 8, for example, the groove 54 may be inserted over the transverse portion 32 of each staple and rotated whereby a kink or crimp is formed in the staple. In this process, the parallel legs 34 and 36 are effectively shortened and the upper strap 22 is tightened against the deck slats 18 while, at the same time, the transverse portion 32 of each staple is tightened against the bottom slats 16 or the bottom of stringer 10, 12 or 14. The invention thus provides a convenient and simple means for shrinkage takeup which does not crack nor harm the wood, but has a great power to bring warped boards flat against the stringers. The holding power of the crimped wire is positive, more positive than a bolt where the nut will back off.

It can thus be seen that the present invention provides a new and improved means for binding the wooden elements of pallets or the like. At the same time, the technique of welding the staples to a steel member on the opposite side of a wood section offers a wide range for improved protection armor to pallet decks and/or many wood units where armor or provision for extended steel frames are desired. The staple anchorage, into and around the wood sections, with shrinkage takeup provisions, provides a dependable and firm base to which almost any steel apparatus such as frames, equipment and the like can be welded, offering a wide range of diverse applications.

Although the invention has been shown in connection with certain specific embodiments, it will be readily apparent to those skilled in the art that various changes in form and arrangement of parts may be made to suit requirements without departing from the spirit and scope of the invention. In this respect, it will be apparent that the U-shaped binders of the invention may be used with equal effectiveness in wooden articles other than pallets such as boxes, crates, skids, building structures and the like.

I claim as my invention:

1. A pallet structure having deck and bottom slats and spacer members disposed between the deck and bottom slats, substantially U-shaped binder elements having transverse portions which overlie the slats on one side of the spacer members and parallel leg portions which extend through the spacer members as well as the deck and bottom slats, binders disposed along the slats on the other side of the spacer members and welded to the ends of the leg portions opposite said transverse portions, said binders comprising flat strips which lie flush against the surface of the slats on the other side of the spacer members, extensions on said flat strips which extend around the ends of said spacer members and are secured to a leg portion of one of said U-shaped binder elements on said one side of the spacer members, and a protective device applied over the edges of said slats at the ends of the pallet and secured to said edges by the portions of said flat strips which extend around the ends of the spacer members.

2. In a pallet structure having deck and bottom slats and spacer members disposed between the deck and bottom slats; the improvement of means for securing the spacer members to the deck and bottom slats comprising substantially U-shaped binder elements having transverse portions which overlie said bottom slats and spaced parallel leg portions which extend upwardly through the bottom slats, the spacer members and the deck slats, the leg portions being at right angles to said transverse portions, and narrow binders disposed along the deck slats and secured to the upper ends of the leg portions, said binders extending along the length of one transverse dimension of the pallet structure and transverse to the lengths of said slats.

3. In a pallet structure having deck and bottom slats and spacer members disposed between the deck and bottom slats; the improvement of means for securing the spacer members to the deck and bottom slats comprising substantially U-shaped metal binder elements having transverse portions which overlie the slats on one side of the spacer members and parallel leg portions which extend through the spacer members as well as the deck and bottom slats, and metal binders disposed along the slats on the other side of the spacer members and welded to the ends of the leg portions opposite said transverse portions, said binders comprising flat strips which extend along the length of one transverse dimension of the pallet structure and which lie flush against the surface of the slats on the other side of the spacer members.

4. The improvement of claim 3 wherein the binders extend around the ends of said spacer members and are secured to a leg portion of one of said U-shaped binder elements.

5. A pallet structure that comprises a deck and a bottom each comprising laterally-spaced slats having rows of holes, spacer members disposed between the deck and bottom and each having holes therethrough in vertical alignment with adjacent rows of vertical holes through the deck and bottom slats, the bottom slats being spaced apart at areas intermediate the ends of the pallet structure to provide spaces for the entry of lift forks, a narrow binder of fusible material disposed along the upper ends of each row of holes in the deck slats and the adjacent holes in the spacers, said binder extending across the entire length of one transverse dimension of the pallet structure, and substantially U-shaped binder elements of fusible material having transverse portions extending between adjacent holes in the bottom slats, said U-shaped binder elements having parallel leg portions extending through said holes and welded at their extremities to said narrow binder of fusible material disposed along the upper ends of each row of holes in the deck slats.

6. Means for binding together adjacent members into a composite assembly comprising substantially U-shaped binder elements each having a transverse portion which overlies one of said members on an outer surface of said assembly and spaced parallel leg portions which extend through all of the members of said assembly, said parallel leg portions being substantially perpendicular to said transverse portions, and a binder disposed along the surface of said assembly opposite said first-mentioned surface, said binder extending between adjacent U-shaped binder elements and being secured to the ends of the leg portions of said binder elements opposite said transverse portions.

7. Means for binding substantially parallel wooden slats to opposite sides of a spacer means comprising substantially U-shaped binder elements each having a transverse portion which overlies a slat on one side of the spacer means and spaced parallel leg portions which extend through the spacer means as well as the slats on either side thereof, said leg portions being at right angles to said transverse portion, and a binder disposed along the slats on the other side of the spacer means and secured to the ends of the leg portions opposite said transverse portions, said binder comprising a flat strip which lies flush against the surface of the slats on the other side of the spacer means and along the entire length of the spacer means.

References Cited in the file of this patent

UNITED STATES PATENTS

| | | |
|---|---|---|
| 2,651,486 | Woodward | Sept. 8, 1953 |
| 2,881,822 | Henry | Apr. 14, 1959 |
| 2,942,825 | Trapp | June 28, 1960 |
| 2,957,376 | Parisi | Oct. 25, 1960 |
| 2,972,917 | Moxon | Feb. 28, 1961 |
| 2,982,507 | Woodward | May 2, 1961 |
| 3,005,610 | Arthur | Oct. 24, 1961 |
| 3,015,355 | Humphrey | Jan. 2, 1962 |
| 3,016,222 | Arthur | Jan. 9, 1962 |